United States Patent
Thomas et al.

(10) Patent No.: US 6,853,693 B1
(45) Date of Patent: Feb. 8, 2005

(54) METHOD AND APPARATUS FOR GAIN NORMALIZATION OF A CORRELATION DEMODULATOR

(75) Inventors: Christopher T. Thomas, San Diego, CA (US); Chun-Ye Susan Chang, Boynton Beach, FL (US); Clinton C Powell, II, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/560,967

(22) Filed: Apr. 28, 2000

(51) Int. Cl.$^7$ .............................. H04L 27/06; H03K 9/00
(52) U.S. Cl. ..................... 375/343; 375/316; 375/324; 370/310
(58) Field of Search .................... 375/343, 219, 375/316, 340, 348, 324, 346, 354, 295, 242; 329/304; 370/310

(56) References Cited

U.S. PATENT DOCUMENTS

| | | | |
|---|---|---|---|
| 5,208,833 A | | 5/1993 | Erhart et al. ................. 375/20 |
| 5,398,259 A | * | 3/1995 | Tsujimoto ................... 375/233 |
| 5,579,304 A | * | 11/1996 | Sugimoto et al. ........... 370/342 |
| 5,619,154 A | * | 4/1997 | Strolle et al. ............... 327/129 |
| 6,289,048 B1 | * | 9/2001 | Richards et al. ............ 375/235 |
| 6,628,699 B2 | * | 9/2003 | Ramberg et al. ............ 375/148 |

* cited by examiner

Primary Examiner—Chieh M. Fan
Assistant Examiner—Jason M. Perilla (57) ABSTRACT

A correlation demodulator unit (20) having gain normalization includes a correlation demodulator (12) for receiving a signal from a receiver (8). The correlation demodulator has a plurality of correlators ($C_1$–$C_N$) corresponding to a plurality of N correlator outputs. A gain normalizer (15) is coupled to the correlation demodulator for accumulating symbol energy on a symbol by symbol basis for each of the plurality of correlator outputs based upon a current symbol decision providing at least an accumulated value within an accumulator (43) for the plurality of correlators and for normalizing the plurality of N correlator outputs using the accumulated value(s).

9 Claims, 8 Drawing Sheets

METHOD AND APPARATUS FOR GAIN NORMALIZATION OF A CORRELATION DEMODULATOR

FIELD OF THE INVENTION

The present invention is directed to method and apparatus for correlation detection, and more particularly to a method and apparatus for normalizing the gain in a correlation demodulator.

BACKGROUND OF THE INVENTION

The Optimum non-coherent detector for detecting frequency shift keying (FSK) signals in an AWGN channel (also known as the Maximum Likelihood Detector) was developed for use to achieve a 4 dB sensitivity improvement over that of a discriminator for 4-level orthogonal signaling (i.e., FLEX®) and 3 dB for ReFLEX®. However the simulcast and multipath performance is not optimum with this class of detector. Techniques have been employed where varying the integration window of the correlator significantly improves the simulcast performance. However, narrowing the integration window may result in a sensitivity loss of about 1.5 dB for FLEX® and more than 3 dB for ReFLEX®. Note, an automatic gain controller (AGC) within a receiver block (see a receiver block 8 in FIG. 1) does not solve the problems described above. Thus, a need exists for a method and apparatus that would still significantly improve simulcast performance and preferably remove phase imbalances that may be experienced while only minimally reducing the sensitivity gain offered by the use of the correlation detector. Ideally, this new correlation detector will also improve the performance under multipath channel conditions such as fading.

DETAILED DESCRIPTION

Figure 1:
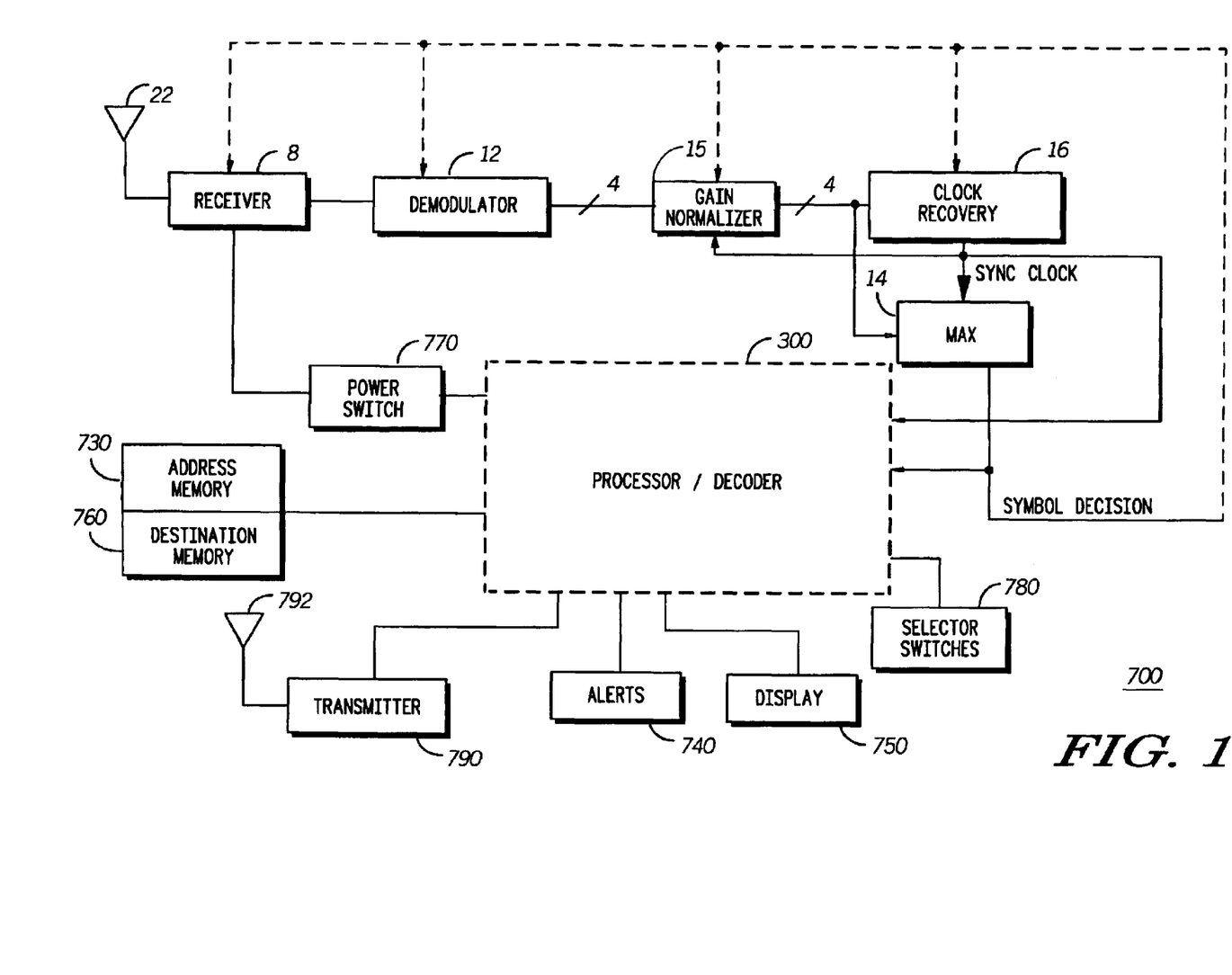
FIG. 1 is a block diagram of a selective call receiver using the method and apparatus in accordance with the present invention.

FIG. 1 illustrates a selective call receiver (such as a pager) 700 utilizing a circuit for providing gain normalization for a correlation demodulator that preferably comprises a correlation demodulator 12 coupled to a gain normalizer 15 wherein the demodulator may have multiple correlators for multi-level symbols (4 levels indicated in FIG. 1). The gain normalizer is preferably coupled to a correlator selector 14 that chooses a correlator having the maximum correlation value. Additionally, the gain normalizer 15 is coupled to a clock recovery block 16. The output from the clock recovery block 16 (the SYNC CLOCK) is fed to the correlator selector 14, the gain normalizer 15 as well as a processor 300. The output (SYMBOL DECISION) from the correlator selector 14 is fed to the processor 300 and is also fed back to the clock recovery block 16, the gain normalizer 15, the demodulator 12 as well as back to a receiver 8 coupled to the demodulator 12. The processor 300 in the selective call receiver 700 preferably controls many of the functions required in a selective call receiver such as decoding. It should be understood that the functions of synchronizing and decoding could be achieved through the use of the processor or respective stand-alone sychronizer (see U.S. patent application Ser. No. 09/076,992 entitled "Method and Apparatus for Accurate Synchronization using Symbol Decision Feedback" by Powell et. al and assigned to the same assignee as the present invention, wherein such reference is incorporated by reference herein) and decoder circuits without the use of the processor 300.

The selective call receiver 700 preferably comprises the receiver 8 for receiving RF signals detected by antenna 22. The received signal output by the receiver 8 is connected to the detector or demodulator (or correlator) 12. The demodulator 12 outputs the demodulated signals to the gain normalizer 15 which in turn provides the gain normalized signals to the clock recovery block 16 and the correlator selector 14. The clock recovery block 16 issues sync clocks to control when the correlator selector 14 selects the corresponding correlator having the maximum correlation to provide a correlator index corresponding to the symbol decision.

The processor 300 is a controller which may include a decoder function that is preferably coupled to the correlator selector 14 and decodes the digital data in accordance with protocol rules established for example, by Motorola's FLEX® paging protocol. For example, the decoder outputs corresponding address information, message information and/or control information. The processor 300 preferably incorporates the decoder function and is the control point for the selective call receiver 700. Among other things, the processor 300 may control the receiver 8, demodulator 12 and the clock recovery block 16. The processor 300 compares received address information with predetermined addresses stored in the address memory 730 in order to trigger one of the alerts 740 or to display a received text or graphics message on display 750. In addition, messages are stored in a destination memory 760. The processor 300 also is connected to a power switch 770 to shut down the receiver 8 and other components of the selective call receiver during periods of time when the particular selective call receiver is not expected to receive information. A user interface to the selective call receiver 700 is achieved through selector switches 780. The selective call receiver may also have acknowledge-back or reverse channel transmitting capability, and accordingly may comprise a transmitter 790 and a transmitting antenna 792. Although the present invention is being presented in a paging or messaging application, the scope of the invention as illustrated is equally applicable to other wireless communication applications such as cellular communication.

Figure 2:
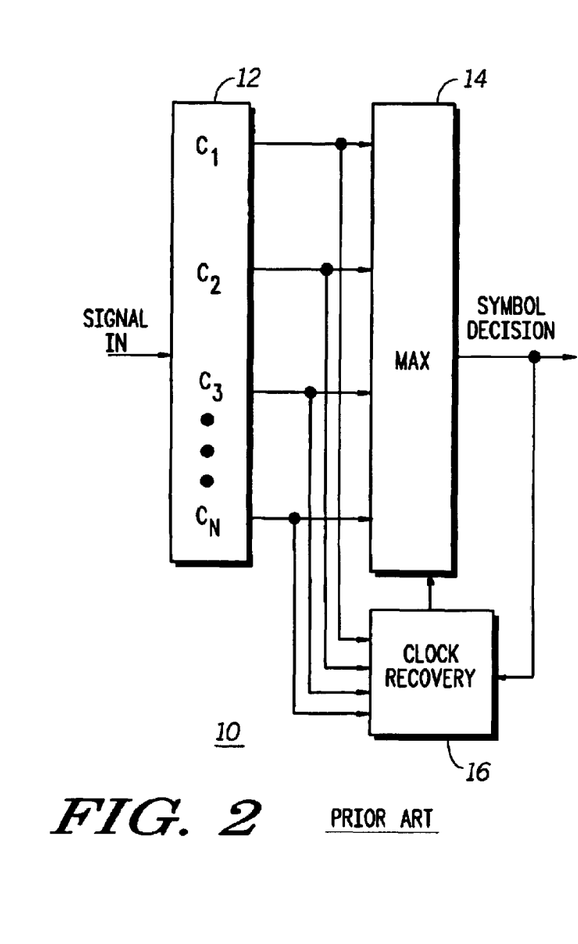
FIG. 2 is a block diagram of a correlation detector known in the art.
Figure 3:
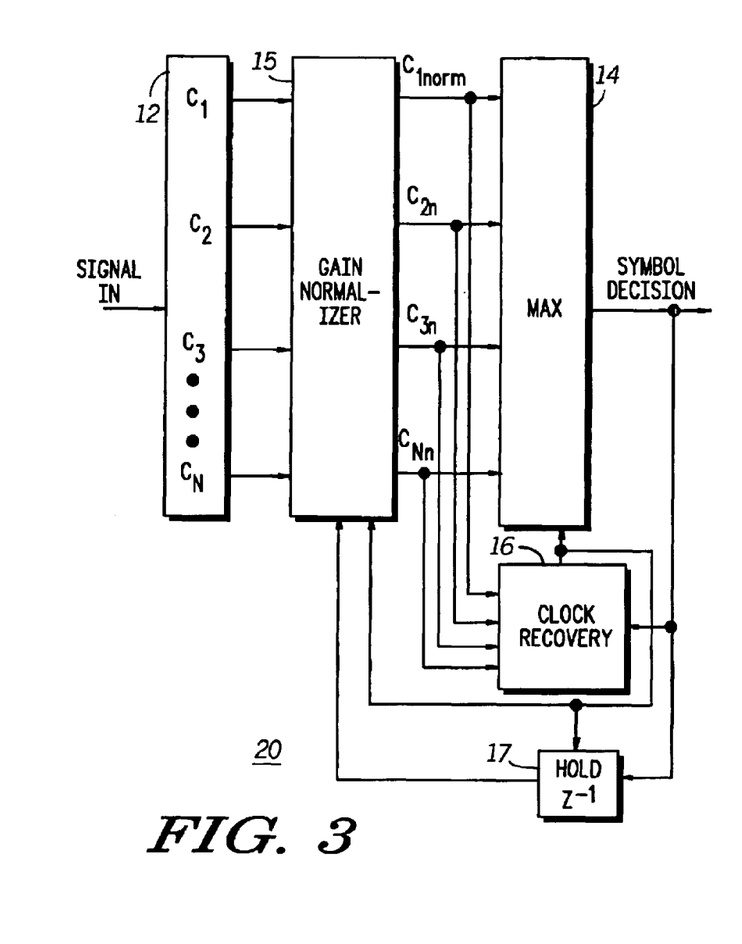
FIG. 3 is a block diagram of a correlation detector in accordance with the present invention.

FIG. 2 illustrates an existing configuration that has many of the problems that is overcome by the present invention as will become apparent in the description of FIG. 3. FIG. 2 includes a correlator 12 coupled to a correlator selector 14 and a clock recovery block 16. As explained in the background, this type of configuration will improve sensitivity over that of a discriminator. However, multipath and simulcast delay spread (SDS) performance is improved when the demodulator outputs from demodulator 12 are gain normalized preferably using a gain normalizer 15 as will be explained in greater detail with the subsequent figures. In the simplest embodiment and referring to FIG. 2, a gain normalizer is introduced between the demodulator 12 and the correlator selector 14 and the clock recovery block 16 as shown in FIG. 3. Prior techniques used to improve the SDS and multipath performance have done so at the expense of the sensitivity performance. The sensitivity performance improvement offered by the correlator of the present invention can be maintained while improving the SDS and multipath performance greatly. Experiments have shown that under multipath and simulcast delay spread conditions there can be up to a 25% difference in page probability between phases in a FLEX® paging system. The current invention not only balances the page probability among the phases, but also improves the page probability in each individual phase by as much as 40%.

Figure 4:
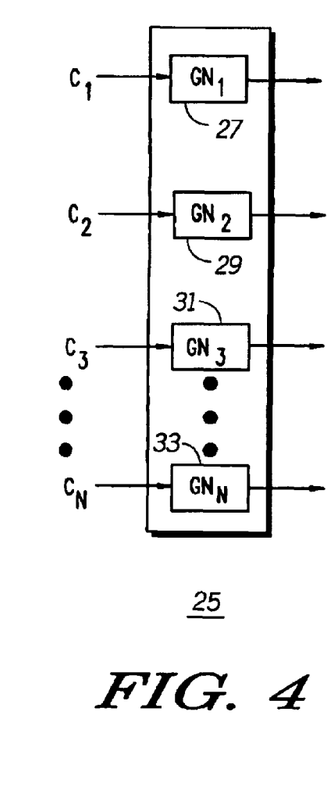
FIG. 4 is block diagram of a gain normalizer in accordance with a first embodiment of the present invention.

The gain normalizer can come in multiple embodiments, but it should be noted that gain normalization is performed after demodulation in accordance with the present invention. In a first embodiment as shown in FIG. 4, the gain normalizer 25 may comprise a plurality of N gain normalizer modules (27, 29, 31–33) corresponding to each of the plurality N of correlators found in the demodulator 12. The details of each gain normalizer module in FIG. 4 can be found in the description of FIG. 8.

Figure 5:
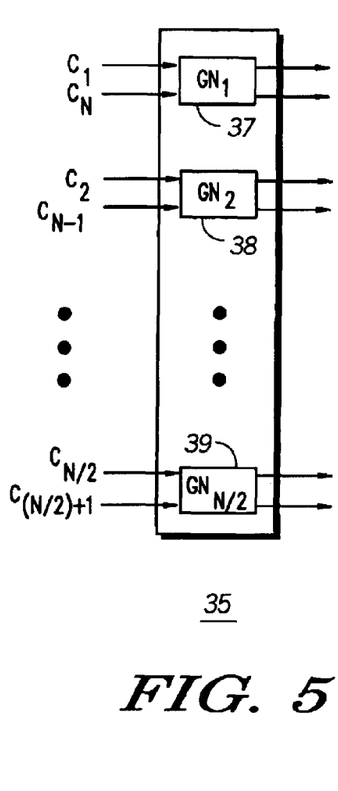
FIG. 5 is block diagram of a gain normalizer in accordance with a second embodiment of the present invention.

In a second embodiment as shown in FIG. 5, the gain normalizer 35 may comprise a plurality of N/2 gain normalizer modules (37–39) which correspond to a progressively combined outermost set to an innermost set of correlator outputs from the plurality of N correlator outputs. In other words, gain normalizer 35 employs a mirroring scheme to provide normalized outputs. The details of each gain normalizer module in FIG. 5 can be found in the description of FIG. 9.

Figure 6:
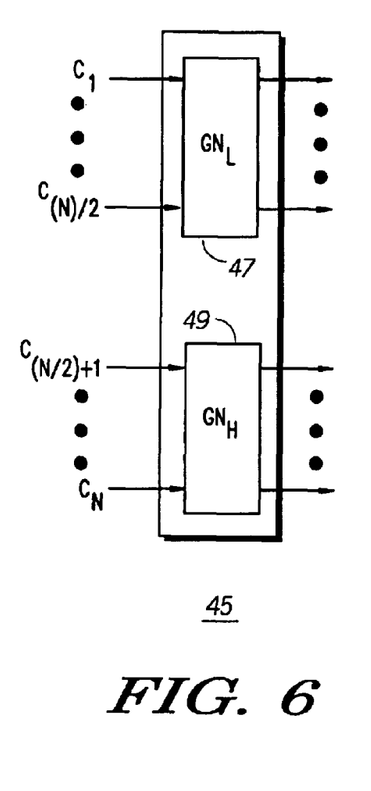
FIG. 6 is block diagram of a gain normalizer in accordance with a third embodiment of the present invention.

In a third embodiment as shown in FIG. 6, the gain normalizer 45 may comprise 2 gain normalizer modules (47 and 49) having a first gain norminalizer module receiving inputs from correlators below a predetermined carrier to provide lower gain normalized signals and a second gain normalizer module receiving inputs from correlators above the predetermined carrier to provide upper gain normalized signals. In other words, gain normalizer 45 employs a high & low scheme to combine correlator outputs. The details of low and high gain normalizer modules in FIG. 6 can be found in the description of FIGS. 10 and 11 respectively.

Figure 7:
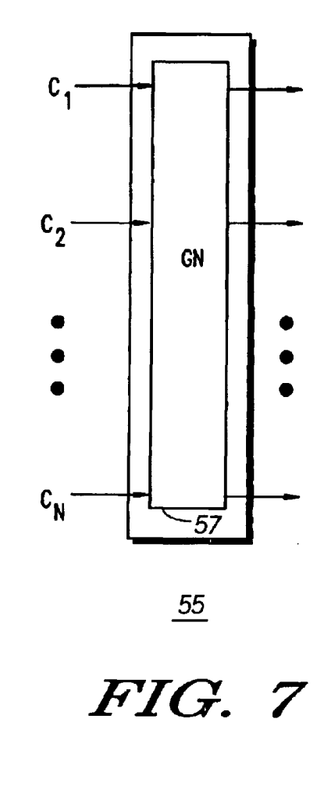
FIG. 7 is a block diagram of a gain normalizer in accordance with a fourth embodiment of the present invention.

In a fourth embodiment as shown in FIG. 7, the gain normalizer 55 may comprise a single gain normalizer module 57 that receives all of the plurality of N correlator outputs as inputs to the single gain normalizer module 57. The details of the gain normalizer module 57 can be found in the description of FIG. 12.

Figure 8:
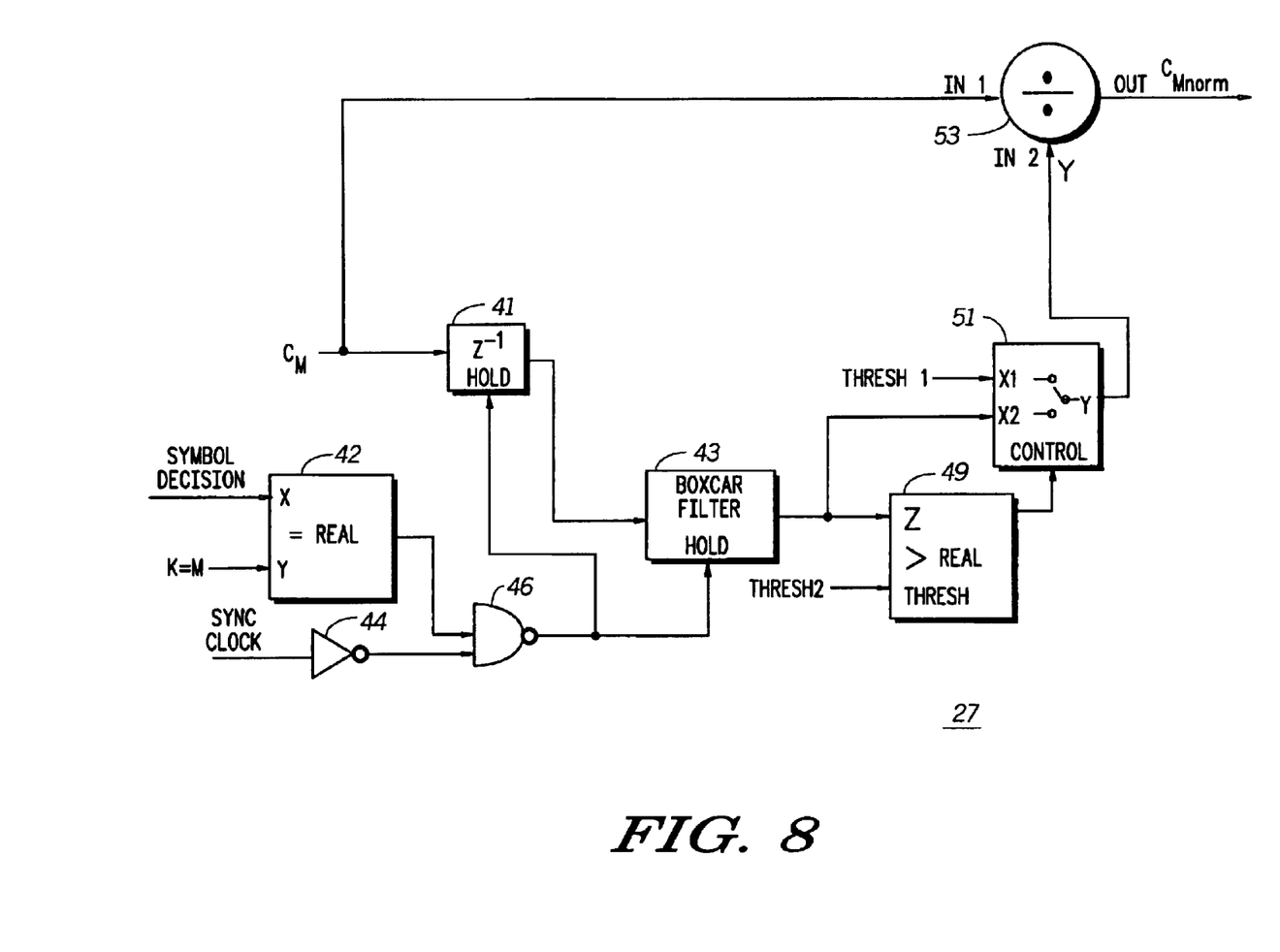
FIG. 8 is a block diagram of a gain normalizer module within the gain normalizer of FIG. 4 in accordance with the first embodiment of the present invention.

FIG. 8 is a block diagram of a gain normalizer module 27 for correlator M output. FIG. 8 receives at its input the SYMBOL DECISION, delayed by one symbol so as not to violate feedback, and compares it to the constant K at comparator 42. The constant K takes on the value M whose range is from 1 to N corresponding to one of the N possible symbol decisions. Gain normalizer module 27 is illustrated where M=1, but gain normalizer modules 29, 31 and 33 of FIG. 4 would be similarly configured. If the delayed SYMBOL DECISION is equal to the constant K then an logical 1 is generated. If the delayed SYMBOL DECISION is not equal to the constant K then an logical 0 is generated. The output of the comparator 42 is then logically NANDed with the inverted SYNC CLOCK, inverted by inverter 44, using NAND gate 46. The inverted SYNC CLOCK of inverter 44 is used to gate the decision of comparator 42. The gated decision of NAND 46 is then used to latch boxcar filter 43 (accumulator or moving average filter) and allows the filter to operate and receive inputs only when the gated signal from NAND 46 is a logical 0. The length of boxcar filter 43 may be anywhere from 1 to infinity. In practice the length will be from 1 to 10. The output of NAND gate 46 is also used to latch into the delay element 41 the current correlation value for the particular correlator M. It also latches at the output of delay element 41 the correlation value for correlator M during the last sync clock instance in which correlator M was the largest of N correlator values. In doing so only those values for correlator M when correlator M is the largest of the N correlators during a sync clock instance are latched into the boxcar filter 43. And so boxcar filter 43 only accumulates correlation values for one of the N correlators.

Boxcar filter 43 then provides at its output the accumulated (or average) value of the inputs from a specific correlator M. The value from boxcar filter 43 is then compared with a constant THRESH2 at comparator 49. If the value from boxcar filter 43 is greater then THRESH2 then a logical 1 is generated at its output. Likewise if the value from boxcar filter 43 is less than or equal to THRESH2 then a logical 0 is generated at its output. The ouput of comparator 49 is then used to control the multiplexer (MUX) 51. If the signal from the output of comparator 49 is a logical 1 then the signal at the X2 input is passed to the output, where the input to X2 is the output (average) from boxcar filter 43. Likewise if the signal from the output of comparator 49 is a logical 0 then the signal at the X1 input is passed to the output, where the input to X1 is a constant THRESH1. THRESH1 is typically set equal to THRESH2, however the two may differ. THRESH1 and THRESH2 are chosen through experiment or measurement such that the output of MUX 51 does not provide a value at its output that is appreciably close to 0 thereby causing a divide by zero (or near zero) at divider 53.

The output of MUX 51 is then applied as the divisor to the divider 53. Divider 53 then divides the current correlation value of correlator M by the divisor to provide at its output the gain normalized version of correlator M's output.

In summary the gain normalizer of FIG. 8 provides all samples at the output of correlator M to be gain normalized by the average of select outputs from correlator M. These select outputs occur only when correlator M has the largest correlation value of the N correlators at its output and a sync clock instance has occurred.

Figure 9:
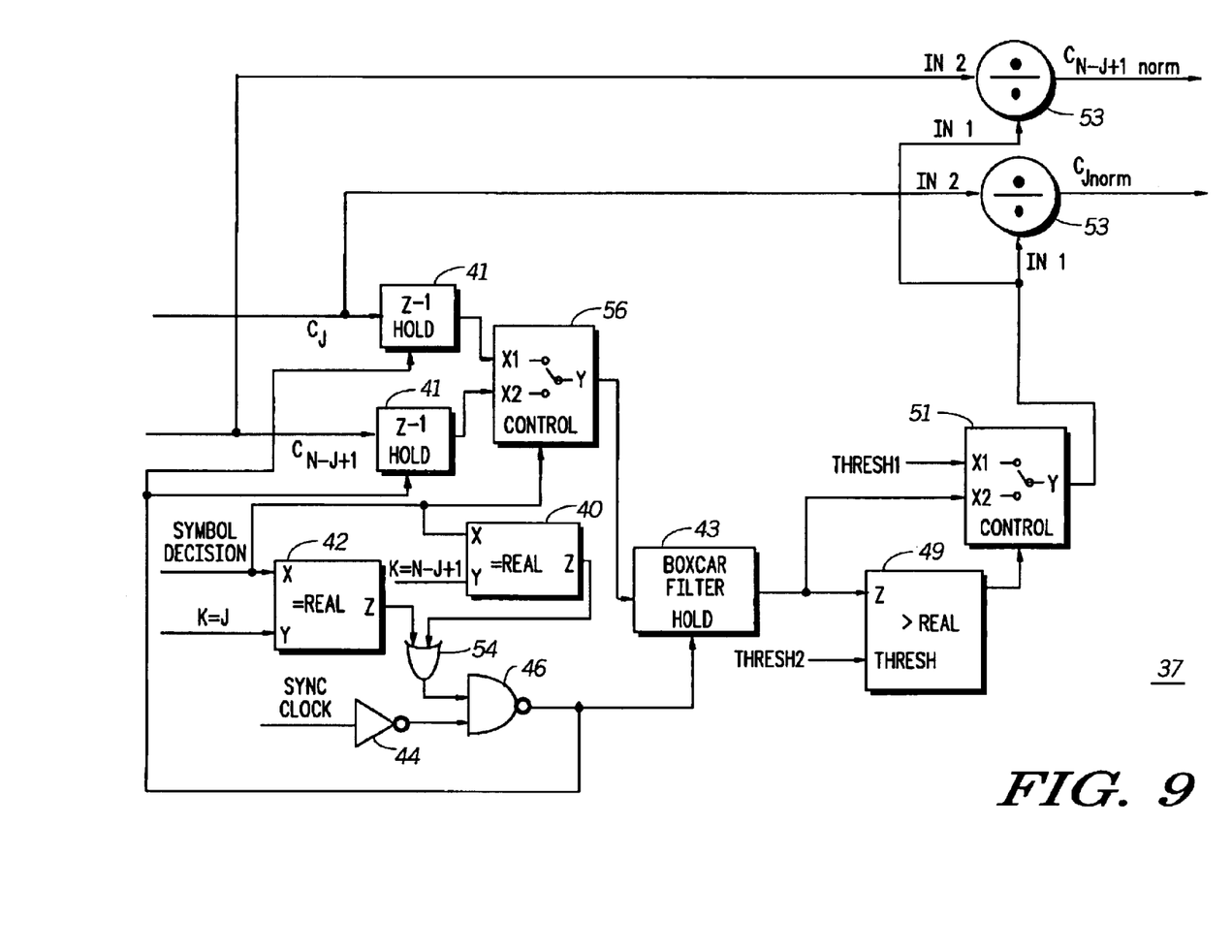
FIG. 9 is a block diagram of a gain normalizer module within the gain normalizer of FIG. 5 using a mirroring technique in accordance with the second embodiment of the present invention.

FIG. 9 is a block diagram of a gain normalizer module which would normalize correlators N−J+1 and J in a mirroring fashion. FIG. 9 receives at its input the SYMBOL DECISION, delayed by one symbol so as not to violate feedback, and compares it to the constant K at comparator 42 and another constant K at comparator 40. The constant K takes on the value J and N−J+1 respectively, where J's range is from 1 to N/2 where N corresponds to the number of possible symbol decisions. As an illustration, Gain normalizer module 37 would demonstrate when J=1 and thus K at comparator 42 is 1 and K at comparator 40 is N. Gain normalizer modules 38 and 39 of FIG. 5 would be similarly configured. If the delayed SYMBOL DECISION is equal to either of the constants K, then an logical 1 is generated. If the delayed SYMBOL DECISION is not equal to the constant K then an logical 0 is generated. The output of the comparator 42 and comparator 40 is then logically ORed at OR gate 54 and then such output from OR gate 54 is logically NANDed with the inverted SYNC CLOCK, inverted by inverter 44, using NAND gate 46. The inverted SYNC CLOCK of inverter 44 is used to gate the decision of comparators 42 and 40. The gated decision of NAND 46 is then used to latch boxcar filter 43 (accumulator or moving average filter) and allows the filter to operate and receive inputs only when the gated signal from NAND 46 is a logical 0. The length of boxcar filter 43 may be anywhere from 1 to infinity. In practice the length will be from 1 to 10. The output of NAND gate 46 is also used to latch into the delay elements 41 the current correlation values for the particular correlators J and N−J+1. It also latches at the output of delay elements 41 the correlation values for the particular correlators J and N−J+1 during the last sync clock instance in which correlators J and N−J+1 respectively were the largest of N correlator values. In doing so only those values for correlators J and N−J+1 when such correlators are the largest of the N correlators during a sync clock instance are latched into the boxcar filter 43. Additionally, a MUX 56 multiplexes the outputs from delay elements 41 as shown and controlled by the delayed SYMBOL DECISION. And so boxcar filter 43 only appropriately accumulates correlation values for one of the J or N−J+1 correlators at each sync clock instance in a mirroring fashion.

Boxcar filter 43 then provides at its output the accumulated (or average) value of the inputs from the specific correlators J and N−J+1. The value from boxcar filter 43 is then compared with a constant THRESH2 at comparator 49. If the value from boxcar filter 43 is greater then THRESH2 then a logical 1 is generated at its output. Likewise if the value from boxcar filter 43 is less then or equal to THRESH2 then a logical 0 is generated at its output. The ouput of comparator 49 is then used to control the multiplexer (MUX) 51. If the signal from the output of comparator 49 is a logical 1 then the signal at the X2 input is passed to the output, where the input to X2 is the output (average) from boxcar filter 43. Likewise if the signal from the output of comparator 49 is a logical 0 then the signal at the X1 input is passed to the output, where the input to X1 is a constant THRESH1. THRESH1 is typically set equal to THRESH2, however the two may differ. THRESH1 and THRESH2 are chosen through experiment or measurement such that the output of MUX 51 does not provide a value at its output that is appreciably close to 0.

The output of MUX 51 is then applied as the divisors to the dividers 53. Dividers 53 then divide the current correlation value of correlator J and N−J+1 by the divisors respectively to provide at its output the gain normalized version of correlator J's output and correlator N−J+1's output.

In summary the gain normalizer of FIG. 9 provides all samples at the output of mirrored correlators J and N−J+1 to be gain normalized by the average of select outputs from these correlators. These select outputs occur only when these correlators have the largest correlation value of the N correlators at its output and a sync clock instance has occurred.

Figure 10:
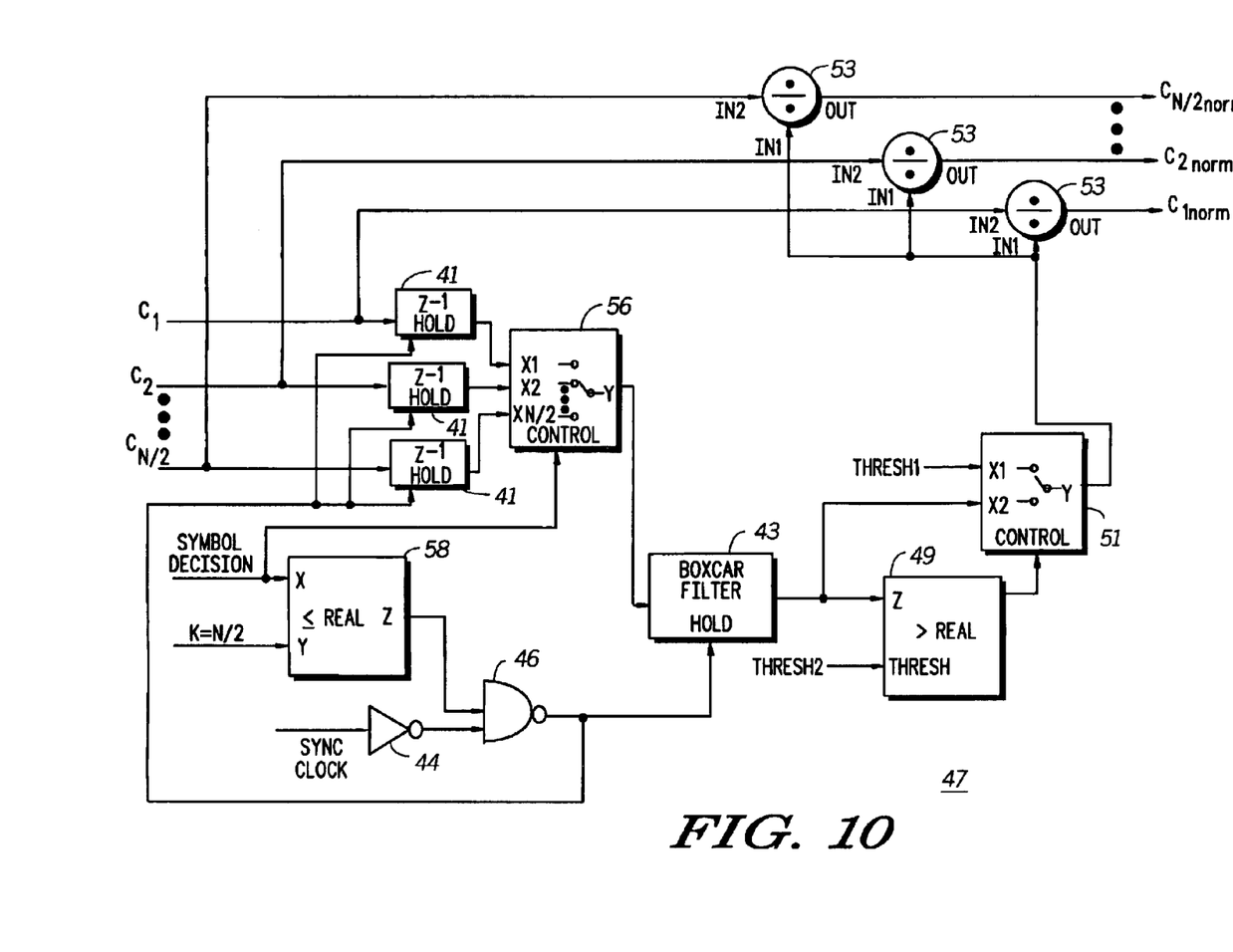
FIG. 10 is a block diagram of a gain normalizer module used for correlators below a predetermined carrier where such module resides within the gain normalizer of FIG. 6 in accordance with the third embodiment of the present invention.

FIG. 10 is a block diagram of a gain normalizer module which would normalize correlators 1 through N/2. FIG. 10 receives at its input the SYMBOL DECISION, delayed by one symbol so as not to violate feedback, and compares it to the constant K at comparator 58. The constant K takes on the value N/2 where N corresponds to the number of possible symbol decisions. As an illustration, Gain normalizer module 47 would demonstrate when N=8 and thus K at comparator 58 is 4. If the delayed SYMBOL DECISION is less than or equal to the constant K, then a logical 1 is generated. If the delayed SYMBOL DECISION is not greater than the constant K then a logical 0 is generated. The output of the comparator 58 is logically NANDed with the inverted SYNC CLOCK, inverted by inverter 44, using NAND gate 46. The inverted SYNC CLOCK of inverter 44 is used to gate the decision of comparator 58. The gated decision of NAND 46 is then used to latch boxcar filter 43 (accumulator or moving average filter) and allows the filter to operate and receive inputs only when the gated signal from NAND 46 is a logical 0. The length of boxcar filter 43 may be anywhere from 1 to infinity. In practice the length will be from 1 to 10. The output of NAND gate 46 is also used to latch into the delay elements 41 the current correlation values for the particular correlators 1 through N/2. It also latches at the output of delay elements 41 the correlation values for the particular correlators 1 through N/2 during the last sync clock instance in which correlators 1 through N/2 were the largest of N correlator values. Additionally, a MUX 56 multiplexes the outputs from delay elements 41 as shown and controlled by the delayed SYMBOL DECISION. And so boxcar filter 43 only appropriately accumulates correlation values for one of the N/2 correlators wherein the low portion is handled by module 47.

Boxcar filter 43 then provides at its output the accumulated (or average) value of the inputs from a specific correlator 1 through N/2. The value from boxcar filter 43 is then compared with a constant THRESH2 at comparator 49. If the value from boxcar filter 43 is greater then THRESH2 then a logical 1 is generated at its output. Likewise if the value from boxcar filter 43 is less then or equal to THRESH2 then a logical 0 is generated at its output. The ouput of comparator 49 is then used to control the multiplexer (MUX) 51. If the signal from the output of comparator 49 is a logical 1 then the signal at the X2 input is passed to the output, where the input to X2 is the output (average) from boxcar filter 43. Likewise if the signal from the output of comparator 49 is a logical 0 then the signal at the X1 input is passed to the output, where the input to X1 is a constant THRESH1. THRESH1 is typically set equal to THRESH2, however the two may differ. THRESH1 and THRESH2 are chosen through experiment or measurement such that the output of MUX 51 does not provide a value at its output that is appreciably close to 0.

The output of MUX 51 is then applied as the divisors to the dividers 53 as shown. Dividers 53 then divide the current correlation value of correlators 1 through N/2 by the divisors respectively to provide at its output the gain normalized version of outputs for correlators 1 through N/2.

In summary the gain normalizer of FIG. 10 provides all samples at the output of correlators 1 through N/2 to be gain normalized by the average of select outputs from these correlators. These select outputs occur only when these correlators have the largest correlation value of the N correlators at its output and a sync clock instance has occurred.

Figure 11:
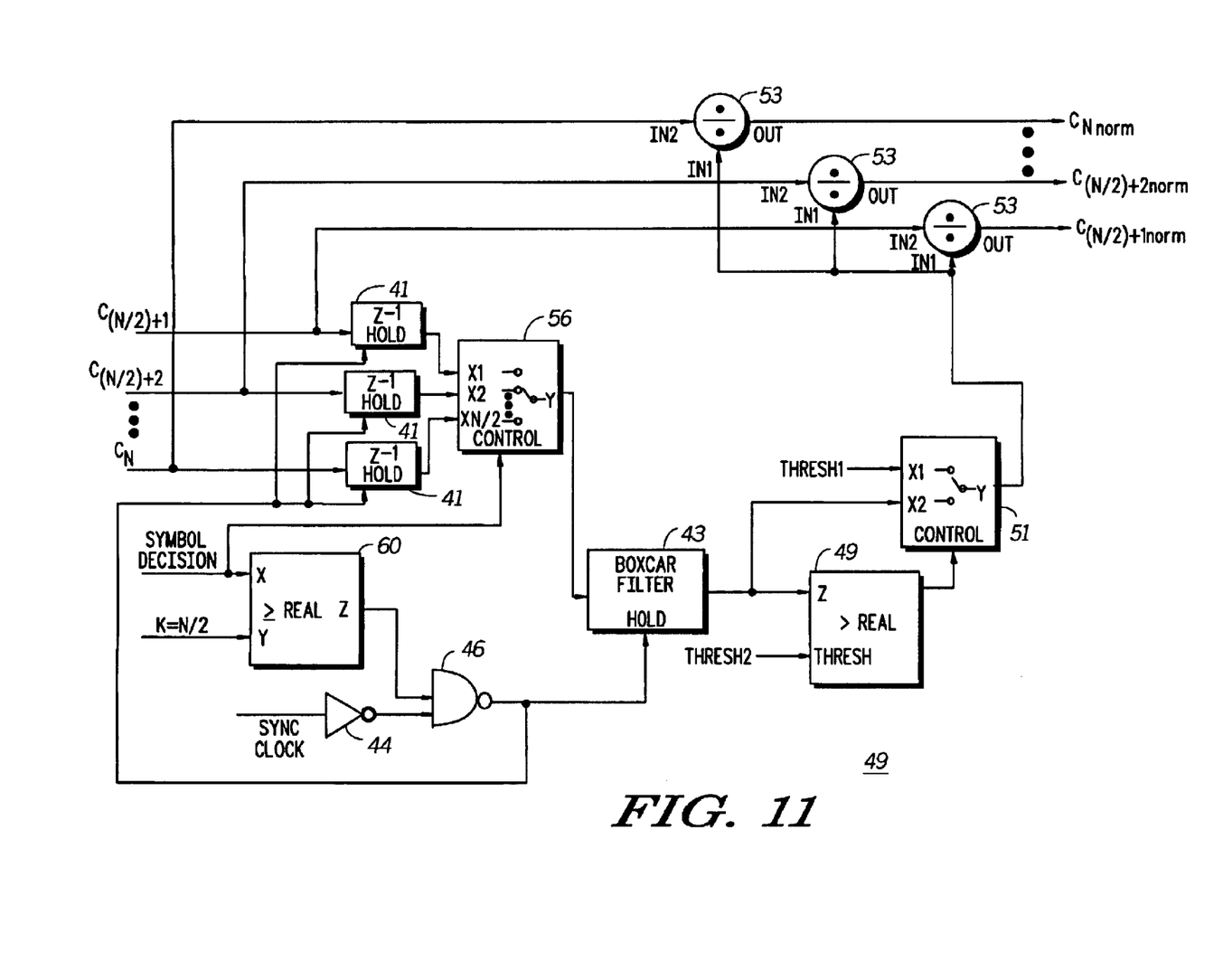
FIG. 11 is a block diagram of a gain normalizer module used for correlators above a predetermined carrier where such module resides within the gain normalizer of FIG. 6 in accordance with the third embodiment of the present invention.

FIG. 11 is a block diagram of a gain normalizer module which would normalize correlators N/2+1 through N. FIG. 11 receives at its input the SYMBOL DECISION, delayed by one symbol so as not to violate feedback, and compares it to the constant K at comparator 60. The constant K takes on the value N/2 where N corresponds to the number of possible symbol decisions. If the delayed SYMBOL DECISION is greater than the constant K, then a logical 1 is generated. If the delayed SYMBOL DECISION is less or equal to the constant K then a logical 0 is generated. The output of the comparator 60 is logically NANDed with the inverted SYNC CLOCK, inverted by inverter 44, using NAND gate 46. The inverted SYNC CLOCK of inverter 44 is used to gate the decision of comparator 60. The gated decision of NAND 46 is then used to latch boxcar filter 43 (accumulator or moving average filter) and allows the filter to operate and receive inputs only when the gated signal from NAND 46 is a logical 0. The remainder of the circuit 49 operates as described above with respect to circuit 47 of FIG. 10 except that dividers 53 divides the current correlation value of correlators N/2+1 through N by the divisors respectively to provide at its output the gain normalized version of outputs for correlators N/2+1 through N. Also, boxcar filter 43 only appropriately accumulates correlation values for one of the N/2, correlators wherein the high portion is handled by this module 49.

In summary the gain normalizer of FIG. 11 provides all samples at the output of correlators N/2+1 through N to be gain normalized by the average of select outputs from these correlators.

Figure 12:
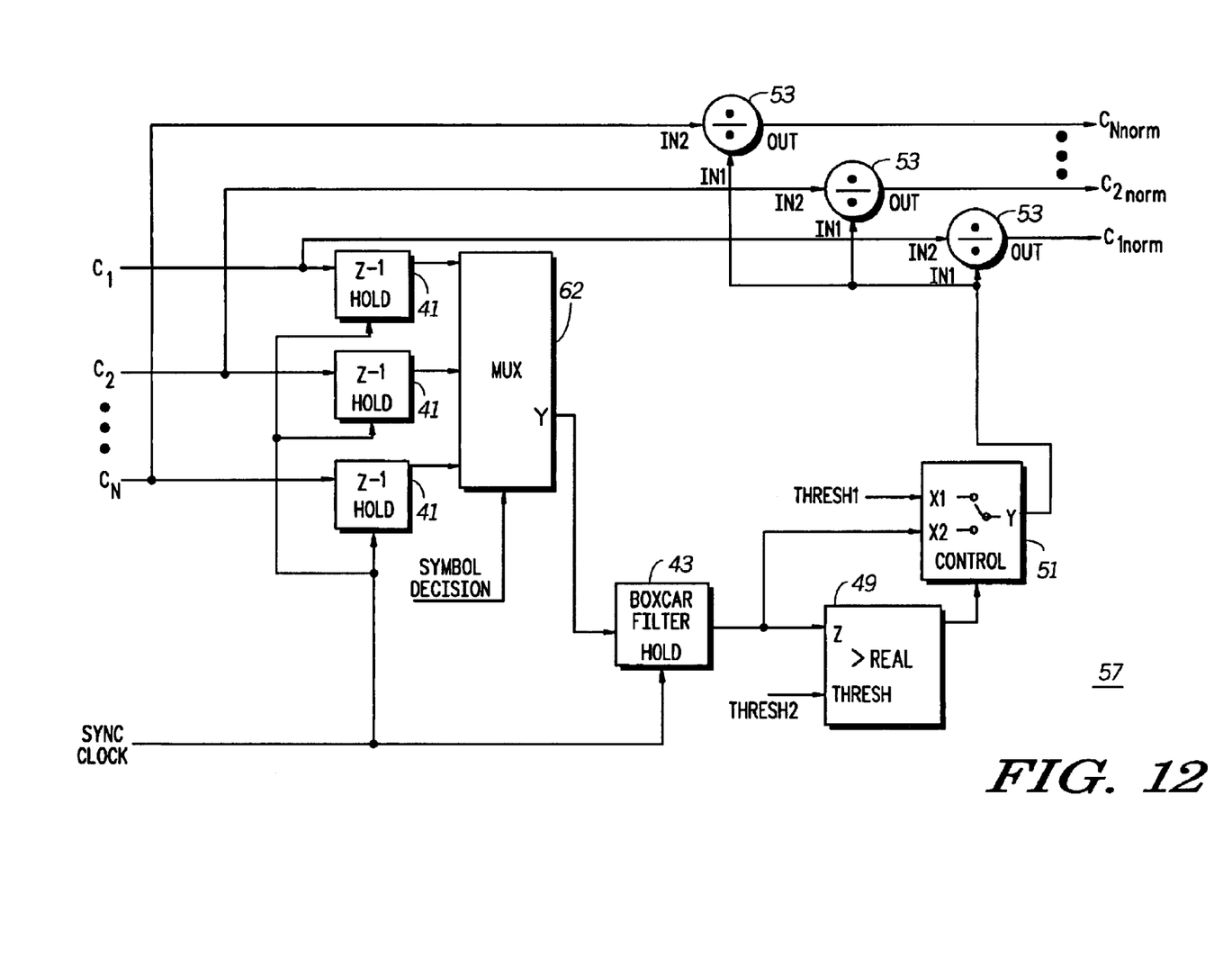
FIG. 12 is a block diagram of a gain normalizer module within the gain normalizer of FIG. 7 in accordance with the fourth embodiment of the present invention.

FIG. 12 is a block diagram of a gain normalizer module 57 which would normalize all correlators 1 through N. FIG. 12 receives at its input the SYMBOL DECISION, delayed by one symbol so as not to violate feedback, and utilizes the SYMBOL DECISION to control a multiplexer 62. A SYNC CLOCK is then used to latch boxcar filter 43 (accumulator or moving average filter) and allows the filter to operate and receive inputs only when the SYNC CLOCK is a logical 0. The SYNC CLOCK is also used to latch into the delay elements 41 the current correlation values for the correlators 1 through N. It also latches at the output of delay elements 41 the correlation values for the particular correlators 1 through N during the last sync clock instance in which correlators 1 through N were the largest of N correlator values. The MUX 62 multiplexes the outputs from delay elements 41 as shown and controlled by the delayed SYMBOL DECISION. And so boxcar filter 43 only appropriately accumulates correlation values for all of the N correlators in a single module.

Boxcar filter 43 then provides at its output the accumulated (or average) value of the inputs from a specific correlator 1 through N. The value from boxcar filter 43 is then compared with a constant THRESH2 at comparator 49. If the value from boxcar filter 43 is greater then THRESH2 then a logical 1 is generated at its output. Likewise if the value from boxcar filter 43 is less then or equal to THRESH2 then a logical 0 is generated at its output. The ouput of comparator 49 is then used to control the multiplexer (MUX) 51. If the signal from the output of comparator 49 is a logical 1 then the signal at the X2 input is passed to the output, where the input to X2 is the output (average) from boxcar filter 43. Likewise if the signal from the output of comparator 49 is a logical 0 then the signal at the X1 input is passed to the output, where the input to X1 is a constant THRESH1.

The output of MUX 51 is then applied as the divisors to the dividers 53 as shown. Dividers 53 then divide the current correlation value of correlators 1 through N by the divisors respectively to provide at its output the gain normalized version of outputs for correlators 1 through N.

In summary the gain normalizer of FIG. 12 provides all samples at the output of correlators 1 through N to be gain normalized by the average of select outputs from these correlators. These select outputs occur only when these correlators have the largest correlation value of the N correlators at its output and a sync clock instance has occurred.

The above description is intended by way of example only and is not intended to limit the present invention in any way except as set forth in the following claims.

What is claimed is:

1. A method for symbol based gain normalization of a correlation demodulator having a plurality of correlators, comprising the steps of:

accumulating on a symbol by symbol basis a plurality of correlator symbol energy outputs based upon a current symbol decision by accumulating progressively an outermost pair to an innermost pair of the plurality of correlator symbol energy outputs providing an accumulated value for each of the outermost pair to the innermost pair of the plurality of correlators; and normalizing the plurality of correlator outputs using the accumulated value(s) by normalizing progressively an outermost pair to an innermost pair of correlators until all correlators are normalized.

2. A method for symbol based gain normalization of a correlation demodulator having a plurality of correlators, comprising the steps of:

accumulating on a symbol by symbol basis a plurality of correlator symbol energy outputs based upon a current symbol decision by accumulating the symbol energies from correlators below a predetermined carrier as a first accumulated value and accumulating the symbol energies from correlators above a predetermined carrier as a second accumulated value providing the first and the second accumulated value for the plurality of correlators; and normalizing the plurality of correlator outputs using the accumulated values by normalizing correlators below a predetermined carrier with the first accumulated value and normalizing correlators above the predetermined carrier with the second accumulated value to provide lower gain normalized signals and upper gain normalized signals respectively.

3. A method for symbol based gain normalization of a correlation demodulator having a plurality of correlators, comprising the steps of:

accumulating on a symbol by symbol basis a plurality of correlator symbol energy outputs based upon a current symbol decision by accumulating the symbol energies from all correlators as a single accumulated value providing at least an accumulated value for the plurality of correlators; and normalizing the plurality of correlator outputs using the single accumulated value by normalizing each of the plurality of correlators by the single accumulated value comprised of a combination of the plurality of correlator outputs.

4. A selective call receiver unit, comprising:
a receiver for receiving radio frequency signals;
a correlation demodulator coupled to the receiver, wherein the correlation demodulator has a plurality of correlators with a plurality of N correlator outputs; and
a gain normalizer coupled to the correlation demodulator for accumulating symbol energy on a symbol by symbol basis of each of the plurality of correlator outputs based upon a current symbol decision providing at least an accumulated value for the plurality of correlators and for normalizing the plurality of correlator outputs using the accumulated value(s) for the plurality of correlators;
wherein the gain normalizer comprises a plurality of N/2 gain normalizer modules which correspond to a progressively combined outermost pair to innermost pair of correlator outputs from the plurality of N correlator outputs.

5. A selective call receiver unit, comprising:
a receiver for receiving radio frequency signals;
a correlation demodulator coupled to the receiver, wherein the correlation demodulator has a plurality of correlators with a plurality of N correlator outputs;
a gain normalizer coupled to the correlation demodulator for accumulating symbol energy on a symbol by symbol basis of each of the plurality of correlator outputs based upon a current symbol decision providing at least an accumulated value for the plurality of correlators and for normalizing the plurality of correlator outputs using the accumulated value(s) for the plurality of correlators;
wherein the gain normalizer comprises two gain normalizer modules having a first gain normalizer module receiving inputs from correlators below a predetermined carrier to provide lower gain normalized signals and a second gain normalizer module receiving inputs from correlators above the predetermined carrier to provide upper gain normalized signals.

6. A selective call receiver unit, comprising:
a receiver for receiving radio frequency signals;
a correlation demodulator coupled to the receiver, wherein the correlation demodulator has a plurality of correlators with a plurality of N correlator outputs; and
a gain normalizer coupled to the correlation demodulator for accumulating symbol energy on a symbol by symbol basis of each of the plurality of correlator outputs based upon a current symbol decision providing at least an accumulated value for the plurality of correlators and for normalizing the plurality of correlator outputs using the accumulated value(s) for the plurality of correlators;
wherein the gain normalizer comprises a single gain normalizer module that receives all of the plurality of N correlator outputs as inputs to the single gain normalizer module.

7. A correlation demodulator unit having equalization feedback, comprising:
a correlation demodulator for receiving a signal from a receiver, wherein the correlation demodulator has a plurality of correlators correspondingly having a plurality of N correlator outputs; and
a gain normalizer coupled to the correlation demodulator for accumulating symbol energy on a symbol by symbol basis of each of the plurality of correlator outputs based upon a current symbol decision providing at least an accumulated value for the plurality of correlators and for normalizing the plurality of N correlator outputs using the accumulated value(s);
wherein the gain normalizer comprises a plurality of N/2 gain normalizer modules which correspond to a progressively combined outermost pair to an innermost pair of correlator outputs from the plurality of N correlator outputs.

8. A correlation demodulator unit having equalization feedback, comprising:
a correlation demodulator for receiving a signal from a receiver, wherein the correlation demodulator has a plurality of correlators correspondingly having a plurality of N correlator outputs; and
a gain normalizer coupled to the correlation demodulator for accumulating symbol energy on a symbol by symbol basis of each of the plurality of correlator outputs based upon a current symbol decision providing at least an accumulated value for the plurality of correlators and for normalizing the plurality of N correlator outputs using the accumulated value(s);
wherein the gain normalizer comprises two gain normalizer modules having a first gain normalizer receiving inputs from correlators below a predetermined carrier to provide lower gain normalized signals and a second gain normalizer receiving inputs from correlators above the predetermined carrier to provide upper gain normalized signals.

9. The correlation demodulator unit of claim 7, wherein the gain normalizer comprises a single gain normalizer module that receives all of the plurality of N correlator outputs as inputs to the single gain normalizer module.

* * * * *